F. STEBLER & F. F. CHASE.
FRUIT SEPARATOR.
APPLICATION FILED DEC. 21, 1915.
1,209,900.
Patented Dec. 26, 1916.
2 SHEETS—SHEET 1.
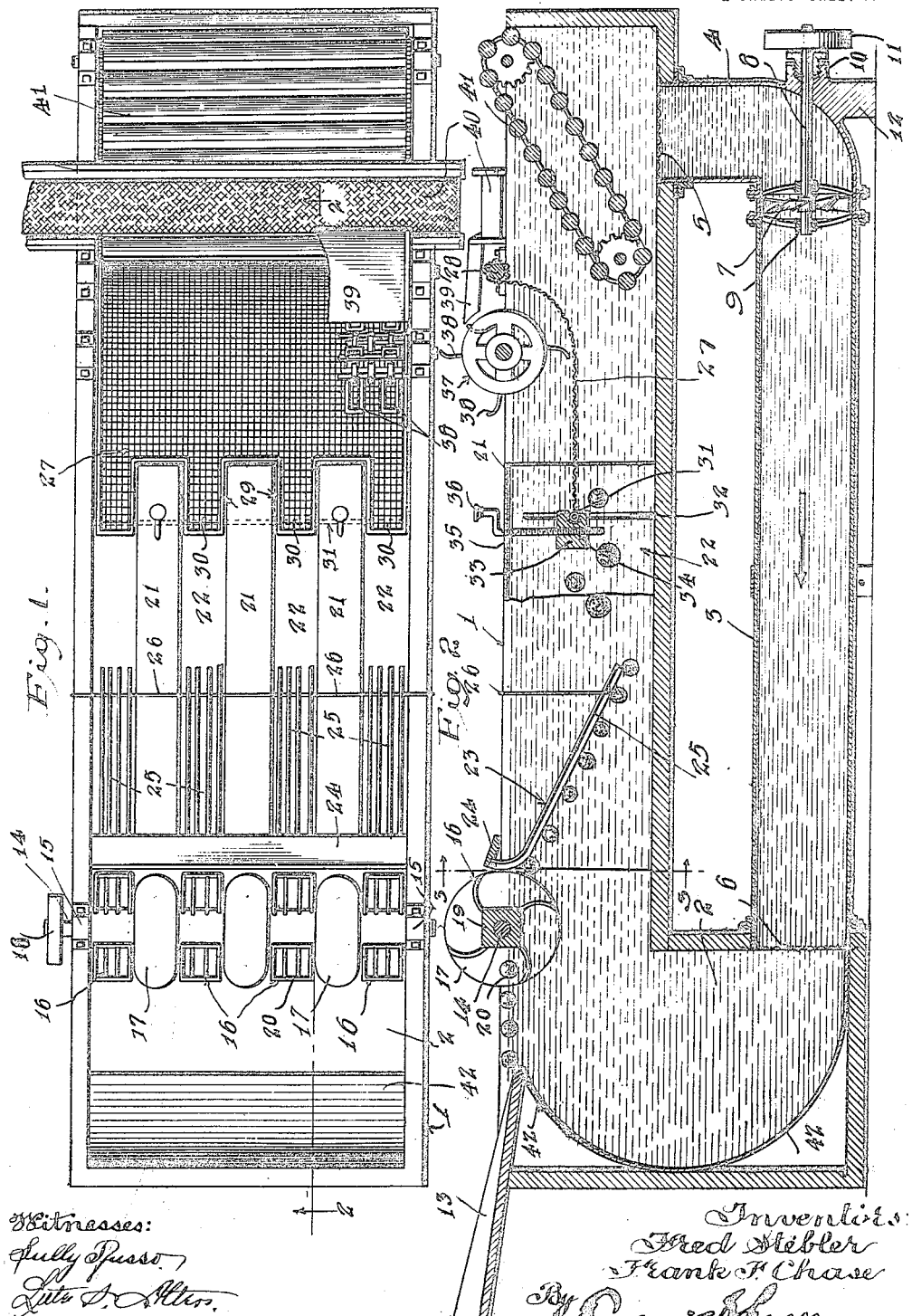

F. STEBLER & F. F. CHASE.
FRUIT SEPARATOR.
APPLICATION FILED DEC. 21, 1915.
1,209,900.
Patented Dec. 26, 1916.
2 SHEETS—SHEET 2.
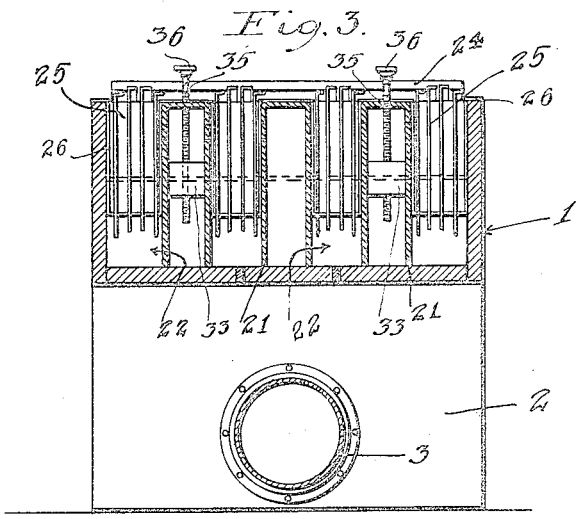
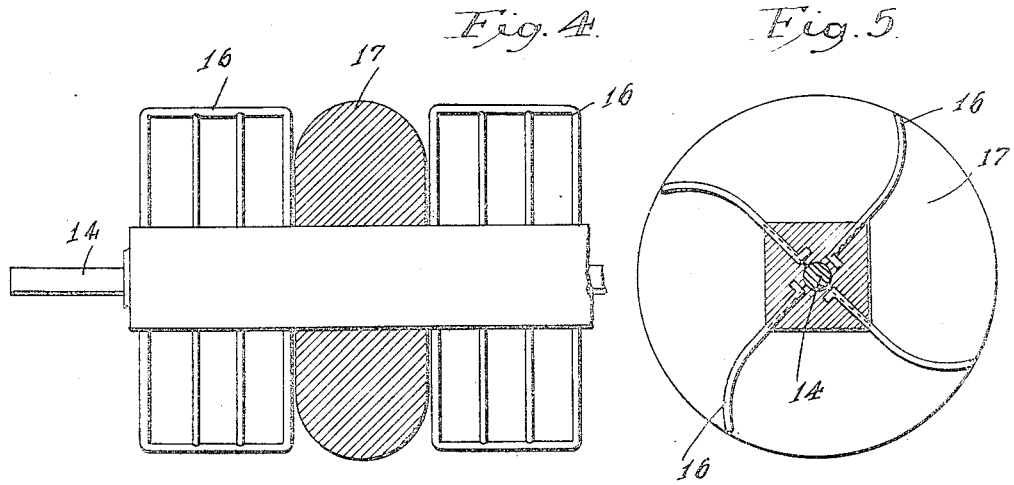

UNITED STATES PATENT OFFICE.

FRED STEBLER AND FRANK F. CHASE, OF RIVERSIDE, CALIFORNIA; SAID CHASE ASSIGNOR TO SAID STEBLER.

FRUIT-SEPARATOR.

1,209,900. Specification of Letters Patent. Patented Dec. 26, 1916.

Application filed December 21, 1915. Serial No. 68,004.

*To all whom it may concern:*

Be it known that we, FRED STEBLER and FRANK F. CHASE, both citizens of the United States, residing at Riverside, in the county of Riverside and State of California, have invented a new and useful Fruit-Separator, of which the following is a specification.

There are in use separators in which fruit bodies are dropped from a predetermined height or level into a tank containing a circulating liquid and a submerged separating member. In separators of this type the fruit bodies when dropped, sink or submerge into the liquid, and in rising, do so at an angle, since they are carried forwardly by the circulating liquid. The angles of rise are governed by the specific gravities of the bodies, by the levels to which the bodies sink and rate of flow of the liquid, thus the separation of the fruit is dependent upon these angles of rise. Fruit bodies having lighter specific gravities rise above and are carried over the separating member, whereas fruit bodies having greater specific gravities do not rise above the separating member before they are carried under the latter by the circulating liquid.

It will be seen that the angles of rise must be gaged to a nicety in order to attain any accuracy of separation. The level to which each fruit body sinks in the liquid must be predetermined and this cannot be accurately governed for the fruit bodies irregularly shaped offer more or less resistance to the liquid when dropped therein and do not sink to the depths predetermined. It is also necessary that the separating member be submerged at a predetermined level in order that the desired separation will take place and this level to which the separating member is set cannot be so accurately determined that inaccuracies in the separation will not occur. Not only do fruit bodies irregularly shaped cause inaccuracies of separation but there is such a wide variance in the specific gravities of the different fruit bodies that it is next to impossible to so regulate the height from which the fruit is dropped, the depth to which the fruit sinks, the position of the separating member and the rate of flow of the liquid that inaccuracies will not occur. Therefore the angles of rise of irregularly shaped fruit and each piece, cannot be determined accurately enough to prevent the fruit bodies from rising at such angles as will cause inaccuracy of separation. From this it is clear that separators of this kind operate very inaccurately.

An object of this invention is to overcome inaccuracies in the separation of fruit bodies of different sizes, shapes and specific gravities and to separate fruit bodies according to their specific gravities and regardless of their size and shape, for smaller and irregularly shaped fruit bodies may be of as good qualities as to juiciness as the larger and more nearly perfect fruit bodies.

Another object is to provide a separator in which there is provided a circulating liquid, a submerged separating member and means which will submerge all of the fruit bodies singly and in predetermined spaced relations to one another to a common point in the circulating liquid and release all the fruit bodies from submergence at said common point in advance of the separating member in order that the released fruit bodies will, dependent upon their specific gravities, rise at predetermined angles owing to their being carried forward by the circulating current and pass over and below the separating member. Preferably means is provided for preventing eddies in the circulating liquid so that the fruit will not be retarded in its movement and the angles of rise thereof will not be negatively affected.

Other objects and advantages may appear from the subjoined detail description.

The accompanying drawings illustrate the invention.

Figure 1 is a top plan view of the separator showing the means for removing the fruit from the device broken away; Fig. 2 is a longitudinal sectional view taken on line 2—2 of Fig. 1; Fig. 3 is a transverse sectional view taken on line 3—3 of Fig. 2; Fig. 4 is a plan view partly in section of the fruit dropping member; and Fig. 5 is a side elevation of the fruit dropping member partly in section.

1 designates an elongated tank which is preferably rectangular and at one end is deepened as at 2. A suitable liquid is contained in the tank and there is provided means for circulating this liquid which consists of a pipe 3 extending parallel to and beneath the bottom wall of the tank and connected at one end with the deepened portion 2. An elbow 4 connects the other end of the pipe with the bottom wall of the tank at the end thereof opposite the deepened portion 2. A screen 5 covers the upper end of the elbow 4 and a screen 6 covers the end of the pipe 3 which is connected with the portion 2. These screens prevent fruit and foreign matter from getting into the pipe and elbow. A circulating propeller 7 arranged to circulate the fluid from the deepened portion of the tank toward the other end thereof is mounted within the pipe 3 near the elbow 4 upon a shaft 8 which is journaled in bearings 9. The shaft 8 extends out through the elbow 4 in a bearing 10 formed on said elbow and on its outer end is fixed a pulley 11 adapted for connection with a source of power, not shown. The bearing 10 is provided with a depending portion 12 which acts as a support for the pipe 3 and elbow 4. The fruit enters the tank at the enlarged end 2 thereof from a chute 13 and floats upon the liquid within the tank.

Located within the tank near the deepened portion 2 thereof is means for lifting the fruit out of and dropping it from a point above back into the liquid in the tank. This means comprises a horizontal rotary shaft 14 journaled in bearings 15 on the upper edges of the side walls of the tank. A plurality of lifting and dropping members 16 are fixed upon the shaft 14 in spaced relation to one another, spacing plates 17 being mounted upon the shaft between the members 16. A drive pulley 18 is fixed to the shaft 14 and is adapted for connection with a suitable source of power, not shown. Each of the members 16 is partially submerged and comprises a hub member 19 fixed to the shaft 14 and supporting a plurality of radial fruit lifting members 20. The fruit lifting members 20 are preferably of skeleton construction and are curved in cross section so that when the members 16 are rotated clockwise the members 20 will lift the fruit out of the liquid and drop it upon the other side of the members 16 back into the liquid.

Directly in advance of the members 16 and alining with the spacing plate 17 are a plurality of spaced parallel partition members 21 which provide in combination with the side walls of the tank a plurality of channels 22 which aline with the members 16. The fruit enters these channels 22 after being dropped into the tank by the members 16 and is prevented from bunching and jamming by the channels which only permit the passage of a few pieces of fruit therethrough at a time. The forming of these channels 22 also eliminates eddy currents in the circulating liquid and provides for a more accurate separation of the fruit, in that the fruit is caused to be submerged in single file and in spaced relation. Were the fruit allowed to bunch the irregular movement thereof would cause the angles of rise to vary from those determined upon.

Mounted within the channels 22 adjacent to the fruit lifting and dropping means is means for submerging the fruit to a point near the bottom wall of the tank and then releasing it from submergence so as to allow it to float upwardly and be separated by a separator screen which will be later more fully described. This means preferably comprises a plurality of downwardly and forwardly inclined submerging members 23, the upper ends of which are secured to a horizontal supporting bar 24 that rests upon the upper edges of the side walls of the tank directly in advance of the members 16. The lower ends of the members 23 are spaced from the bottom wall of the tank sufficiently to allow the fruit to pass between the lower ends thereof and the bottom of the tank. Each member 23 comprises a plurality of spaced parallel rods 25, certain of which are arranged above the other so that the members 23 are curved in cross section and cause the fruit to center in moving along in contact therewith, thus preventing it from engaging the sides of the tank or members 21. A supporting element 26 secured at its ends to the sides of the tank near the upper edges thereof is extended downwardly between the lower ends of the members 23 to hold them spaced apart and over the partition members 21. Preferably the bar 24 is slidable upon the upper edges of the side walls of the tank, thus the submerging members 23 are permitted longitudinal adjustment relative to the tank.

There is provided separating means which consists of a horizontal separating screen 27 pivoted upon a transverse shaft 28 which is mounted on the upper edge of the tank 1 and is located beyond the submerging means in submerged relation to and above the lower ends of the members 23. The free edge of the screen 27 is cut out or recessed as at 29 to provide tongues 30 that extend into the channels 22.

There is provided means for adjusting the screen 27 vertically which consists of a horizontal rod 31 vertically adjustably mounted within vertical slots 32 formed in the adjacent ends of the partition members 23, said slots alining with one another. The tongues 30 of the screen 27 are secured upon the rod 31 and connected with the rod 31 and mounted in the outermost of the members 23 are blocks 33 having vertical screw-threaded openings 34 therethrough. Vertical adjusting screws 35 extend into the members 23 and through the screw-threaded openings 34 of the blocks. The upper ends of the screws are provided with crank handles 36 whereby the screws may be turned to raise or lower the separator screen 27.

Mounted transversely of the tank 1 and partly submerged in the liquid therein above the screen 27 is a rotary fruit elevating member 37. This member may be of any suitable type and in this instance includes a plurality of fingers 38 which engage, pick up and deposit the fruit upon a chute 39 extending parallel to the longitudinal axis of the tank and emptying upon a transverse endless conveyer 40. The conveyer 40 is arranged to deposit the fruit to one side of the tank and may be of any suitable type or size.

There is provided an inclined conveyer elevator 41 in the end of the tank opposite to the portion 2 thereof to remove fruit which passes beneath the screen 21 from the tank.

To prevent the liquid which is forced out through the pipe into the deepened portion 2 of the tank 1 from encountering the end wall of the tank and producing eddies, there is mounted within the deepened portion 2 an upwardly curved plate 42. The liquid from the pipe 3 encounters this upwardly curved plate and is guided upwardly and forwardly in the direction of its flow and this as will be clearly seen will prevent formation of such eddies as would tend to interfere with the movement of the fruit bodies discharged into the tank.

In operation, the fruit to be separated passes into the tank at the enlarged end 2 thereof from the feed chute 13. The liquid in the tank is caused to circulate from left to right by the propeller 7 and the fruit will float toward the lifting and dropping means which will be rotating from left to right. During their rotation the blades 20 pass under, engage and lift the fruit out of the tank and drop it back into the liquid at a point in the rear of the submerging means comprising the members 23, causing it to sink into the liquid. All the fruit is thus dropped from a predetermined height into the channels 22 and as it is carried forward by the circulating liquid it engages and is forced downwardly by and to the lower ends of the members 23, thus all of the fruit is released below the separator screen 27. According to its buoyancy the fruit floats upwardly and the lighter and frosted fruit will pass over and upon the screen 27, while the heavier and unfrosted fruit will pass under the screen 27. Fruit, such as oranges, when frosted, having light specific gravities will rise more quickly and will thus be carried forward above the screen, whereas the fruit of greater specific gravities will not rise sufficiently quick to reach a level above the screen before it is carried past the screen by the circulating liquid. Fruit floating above the screen 27 will be picked up by the elevator 37 and deposited upon the transverse conveyer 40 where it is conducted to a platform or some other suitable support or apparatus. Fruit floating and passing underneath the member 27 will be engaged and elevated from the tank by the elevator conveyer 41. The members 23 may be moved toward or away from the separating member or screen 27 and dependent upon the altitudes of rise of the fruit, this relation between the members 23 and 27 is determined, it being seen that, for example, when the members 23 are close to the screen 27 the altitudes of rise of the fruit are less than when the members 23 are farther away from the separating member.

An important feature of this invention is that the fruit bodies, regardless of shape, size and specific gravity begin their rise in the current from a common level, and will owing to their natural buoyancies float upwardly and forwardly, and when the different altitudes angles of rise of fruit bodies of different specific gravities have been determined, the screen 27 may be set at a level to catch the bodies having a certain desirable specific gravity. The adjusting of the screen is easily effected by turning the screw 35 in the appropriate direction.

It is understood that the invention is not limited to the exact construction shown in the drawings and described above, but that deviations therefrom may be made within the spirit and scope of the invention.

We claim:

1. A fruit separator comprising a tank containing a liquid, means to create a circulation of the liquid, a submerged separating member mounted within the tank, means to hold fruit submerged and to release fruit from submergence at a point below and in advance of the separating member.

2. In a fruit separator, a tank containing a liquid, means to create a circulation of the liquid in one direction, a separating member mounted within the tank, and means to release fruit from a given point of submergence below and in advance of the separating member.

3. A fruit separator comprising a tank having a liquid therein, means to create a circulation of the liquid in one direction, separating means within the tank, means to drop the fruit from a predetermined elevation into the liquid in advance of the separating means, and means between the dropping means and separating means for directing the fruit downwardly after it is dropped and releasing it from submergence at a point below the separating means.

4. In a fruit separator, a tank containing a liquid, means to circulate the liquid, a submerged separating member, means to drop the fruit into the liquid, and means to hold the fruit submerged and release it at a point of submergence in advance of the separating member.

5. A fruit separator comprising a tank containing a liquid, means to circulate the liquid in the tank, a submerged separating member, means to vertically adjust said separating member, and means to submerge the fruit and release it from submergence at a point below and in advance of the separating member.

6. A fruit separator comprising a tank containing a liquid, means to circulate the liquid in one direction, a submerged separating member, and a fruit submerging member mounted in advance of and inclined downwardly and toward the separating member, said submerging member having its lower end located below the separating member and spaced from the bottom of the tank.

7. A fruit separator comprising a tank containing a liquid and having a series of longitudinal channels therein, a submerged separating member mounted within the tank between one end thereof and the channels, means to circulate the liquid in the tank in the direction toward the separating member, and means within the channels to submerge the fruit and release it from submergence at a point below and in advance of the separating member.

8. A fruit separator comprising a tank containing a liquid and having a series of longitudinal channels therein intermediate its ends, a submerged separating member mounted within the tank between one end thereof and the channels, means to circulate the liquid in the tank in the direction toward the separating member, means within the channels to submerge the fruit and release it from submergence at a common point and in advance of the separating member, and means to drop the fruit into the liquid in advance of the submerging member.

9. A fruit separator comprising a tank containing a liquid and having a series of longitudinal channels therein, a submerged separating member mounted within the tank between one end thereof and the channels, means to circulate the liquid in the tank in the direction toward the separating member, means within the channels to submerge the fruit and release it from submergence at a point below and in advance of the separating member, and means to vary the point of submergence of the separating member.

10. In a fruit separator comprising a tank containing a liquid, means to conduct fruit into the tank, a submerged separating member mounted within the tank, means to circulate the liquid in the direction toward the separating member, and means to submerge all the fruit and release it at a common submergence point in advance of and below the separating member.

11. A fruit separator comprising a tank containing a liquid, means to conduct fruit into the tank, a submerged separating member mounted within the tank, means to lift the fruit out of the liquid and drop it from a predetermined elevation back into the liquid, means to circulate the liquid from the point where the fruit enters the tank toward the separating member, and means between the separating member and lifting and dropping means to submerge the fruit and release it from submergence at a point in advance of and below the separating member.

12. In a fruit separator a tank containing a liquid, a submerged separating member mounted within the tank, means to conduct fruit into the tank, a plurality of spaced longitudinal partitions mounted within the tank and providing a series of channels between one another and the walls of the tank, means to circulate the liquid from the point where the fruit enters the tank toward the separating member, and a plurality of submerging members mounted between the partitions and being inclined downwardly and in the direction of the separating member, the lower ends of said submerging members being spaced from the bottom of the tank a distance sufficient to allow fruit to pass thereunder and being located below the separating member.

13. In a fruit separator a tank containing a liquid, a submerged separating member mounted within the tank, means to conduct fruit into the tank, a plurality of spaced longitudinal partitions mounted within the tank intermediate the ends thereof and providing a series of channels between one another and the walls of the tank, means to circulate the liquid from the point where the fruit enters the tank toward the separating member, a plurality of submerging members mounted between the partitions and being inclined downwardly and in the direction of the separating member, the lower ends of said submerging members being spaced from the bottom of the tank a distance sufficient to allow fruit to pass thereunder and being located below the separating member, and means in advance of the submerging members for lifting the fruit out of and dropping it back into the liquid.

14. In a fruit separator a tank containing a liquid, a submerged separating member mounted within the tank, means to conduct fruit into the tank, a plurality of spaced longitudinal partitions mounted within the tank intermediate the ends thereof and providing a series of channels beween one another and the walls of the tank, means to circulate the liquid from the point where the fruit enters the tank toward the separating member, a plurality of submerging members mounted between the partitions and being inclined downwardly and in the direction of the separating member, the lower ends of said submerging members being spaced from the bottom of the tank a distance sufficient to allow fruit to pass thereunder and being located below the submerging members in advance of the submerging members for lifting the fruit out of and dropping it back into the liquid, and means to vertically adjust the separating member.

15. In a fruit separator a tank containing a liquid, a submerged separating member mounted within the tank, means to conduct fruit into the tank, a plurality of spaced longitudinal partitions mounted within the tank intermediate the ends thereof and providing a series of channels between one another and the walls of the tank, means to circulate the liquid from the point where the fruit enters the tank toward the separating member, a plurality of submerging members mounted between the partitions and being inclined downwardly and in the direction of the separating member, the lower ends of said submerging members being spaced from the bottom of the tank a distance sufficient to allow fruit to pass thereunder and being located below the separating member, and means to vertically adjust the separating member.

16. A fruit separator comprising a tank containing a liquid, a submerged separating member within the tank, means to conduct fruit into the tank, means to circulate the liquid in the tank in a direction from the point where the fruit enters the tank toward the separating member, means to submerge the fruit and release it from submergence at a point in advance of and below the separating member, means to remove the fruit from the liquid and tank at a point above the separating member, and means rearwardly of the separating member for removing fruit from the liquid and tank that has passed below the separating member.

17. A fruit separator comprising a tank being deepened at one end and adapted to contain a liquid, a circulating pipe having connection with the deepened and other end of the tank, means within the pipe to circulate the liquid within the pipe and tank, a submerged separating member mounted within the tank, means to conduct fruit into the tank in advance of the separating member, and means to submerge and release the fruit from submergence at a point below and in advance of the separating member.

18. A fruit separator comprising a tank containing a liquid, means to conduct fruit into the tank, a separating member submerged within the tank, means to circulate the liquid from the point where the fruit enters the tank toward the separating member, means to lift the fruit out of the liquid and drop it from a predetermined point back into the liquid mounted in advance of the separating member and including a plurality of rotary blades which are curved in cross section and extend into the liquid, and means between the last-named means and separating member for submerging the fruit and releasing it from submergence at a point below the separating member.

19. A fruit separator comprising a tank containing a liquid, a separator member submerged in the tank, means to circulate the liquid in a direction toward the separating member, a deflector mounted in the tank and inclined downwardly toward the separator member to cause all the fruit as it is advanced by the circulating fluid to be submerged to a given point and to be released from said given point.

20. The method of separating bouyant bodies of different specific gravities from one another, which method comprises submerging the bodies to a common level in a fluid current, allowing the bodies to rise at greater and less altitudes according to their specific gravities, and removing said bodies from the fluid according to their different altitudes of rise.

21. The method of separating buoyant bodies of different specific gravities from one another, which method comprises releasing said bodies from a common level of submergence in a fluid current, and removing said bodies from different levels of the fluid in accordance with their altitudes of rise.

22. Means forming a channel, means to produce a current of fluid in said channel, means to lower buoyant bodies of different specific gravities to a common level of submergence in said fluid, and means to receive the bodies of one specific gravity separate from the bodies of another specific gravity according to the altitude of rise of said bodies.

23. In a fruit separator, a tank containing a liquid and having one end deepened, a curved deflector plate mounted in said deepened end, a circulating pipe connected with the deepened end opposite the deflector plate and with the other end of the tank, means to circulate a liquid through the pipe and tank, and fruit separating means mounted within the tank.

24. In a fruit separator a tank containing a liquid, a substantially horizontal perforate separator member mounted within the tank below the surface of the liquid therein, means to circulate the liquid in a direction toward the separating member, means to deposit fruit into the liquid at the end of the tank opposite the separating member, and means within the tank between the last-named end and separating member to engage the fruit submerging it to a point below the separating members and release the fruit from submergence at said point below the separating member whereby the fruit in rising, dependent upon its specific gravity, will be carried above and below the separating member by the circulating fluid.

25. In a fruit separator a tank containing a liquid, a separating member submerged in the liquid, means to deposit fruit into the liquid in the tank, parallel spaced partitions mounted in the tank intermediate the ends thereof, said partitions being arranged longitudinally of the tank, downwardly inclined fruit submerging members mounted between the walls of the tank and between the partitions, said members being inclined toward the separating member and having their lower ends spaced from the bottom of the tank and below the separating member, said partitions being spaced from one another and from the walls a distance sufficient to provide channels to accommodate fruit passing therethrough in single file only, and means to circulate the liquid in the tank in a direction from the point where fruit enters the tank toward the separating member whereby fruit will be carried against the inclined submerging members, submerged in single file within the spaces between the partition members and released one piece at a time at a point below the separating member.

26. The method of separating buoyant bodies of different specific gravities which comprises submerging the bodies in single file and one at a time to a common level in a fluid current, allowing the bodies to rise singly at greater or less altitudes according to their specific gravities and then removing the bodies from the fluid according to their different altitudes of rise.

27. A fruit separator comprising a tank containing a liquid, a separating member mounted within the tank and submerged in liquid therein, means to submerge fruit to and release it from a point below and in advance of the separating member, and means to cause the liquid to flow from the last-named means toward the separating member whereby the fruit dependent upon its specific gravity will pass above and below the separating member.

28. A fruit separator comprising a tank containing a liquid, means to create a circulation of the liquid, a separating member mounted within the tank, and means to release fruit from submergence at a point below the separating member.

29. In a fruit separator, a tank containing a liquid, a separating member mounted within the liquid within the tank and pivotally secured at its upper end to the tank, means to convey fruit into the liquid in the tank, means to submerge the fruit to and release it from a common point of submergence below the separating member, means to create a circulation of the liquid in the tank in the direction toward the separating member, means above the separating member extending into the liquid to remove the fruit therefrom, and means below the separating member to remove fruit from the liquid to the tank.

30. In a fruit separator, a tank containing a liquid, a separating member adjustably mounted within the tank and pivoted thereto, means to release fruit from submergence at a point below the separating member, and means to create a circulation of the liquid in a direction from the last named means toward the separating member.

31. In a fruit separator, a tank containing a liquid, a separating member mounted within the tank, a submerging member mounted within the tank and releasing fruit from submergence at a point below the separating member, said submerging member being movable toward and away from the separating member, and means to create a circulation of the liquid from the submerging to the separating member.

32. In a fruit separator, a tank containing a liquid, a separating member mounted within the tank, a submerging member mounted within the tank and releasing fruit from submergence at a point below the separating member, said submerging member being movable toward and away from the separating member, means to create a circulation of the liquid from the submerging to the separating member, and means to vertically adjust said separating member.

33. In a fruit separator, a tank containing a liquid, a submerged separating member mounted within the tank, means to release fruit from submergence at a point below the separating member, being movable toward and away from the separating member, means to conduct fruit to the tank, and means to create a circulation of the liquid in the tank in a direction from the submerging means to the separating member.

In testimony whereof, we have hereunto set our hands at Riverside, California, this 15th day of December, 1915.

FRED STEBLER.
FRANK F. CHASE.

In presence of—
C. E. BRAUSE,
ROY L. HAYLUND.